Feb. 22, 1949. J. F. KOVALSKY 2,462,203
SPEED REGULATING SYSTEM
Filed Oct. 30, 1947 2 Sheets-Sheet 1

WITNESSES:
Robert C. Baird
Wm. C. Groome

INVENTOR
Joseph F. Kovalsky.
BY
James N. Ely
ATTORNEY

Patented Feb. 22, 1949

2,462,203

UNITED STATES PATENT OFFICE 2,462,203

SPEED REGULATING SYSTEM

Joseph F. Kovalsky, Buffalo, N. Y., assignor to Westinghouse Electric Corporation, East Pittsburgh, Pa., a corporation of Pennsylvania Application October 30, 1947, Serial No. 783,099

14 Claims. (Cl. 318—71)

This invention relates to regulating systems and in particular to speed regulating systems for controlling the relative speeds of a plurality of drive motors.

An object of this invention is the provision in a speed regulating system for a plurality of drive motors, of means for changing the speed of any one of the motors while effecting an automatic proportional change in the speed of certain of the other motors.

Another object of this invention is the provision in a speed regulating system for a plurality of drive motors, for making a permanent change in the speed of any one of the motors and simultaneously therewith effect an automatic proportional permanent change in the speed of certain of the other related motors.

A further object of this invention is the provision in a speed regulating system for a plurality of drive motors for making a momentary change in the speed of any one of the motors and simultaneously therewith effect an automatic proportional momentary change in the speed of certain of the other related motors.

A more specific object of this invention is the provision in a speed regulating system for a plurality of drive motors, for selectively making either a permanent or momentary change in the speed of any one of the motors and to simultaneously therewith effect a corresponding proportional change in the speed of certain of the other related motors.

A further specific object of this invention is to provide in a regulating system for regulating the relative speeds of a plurality of drive motors for strip material, for interconnecting the controls of the individual motor regulators one to another with respect to an intermediate source whereby an adjustment of a control to either side of the intermediate source effects a change in the speed of the motor associated with such control and an automatic proportional change in the speed of all of the following motors without affecting the speed of the other motors.

Figure 1:
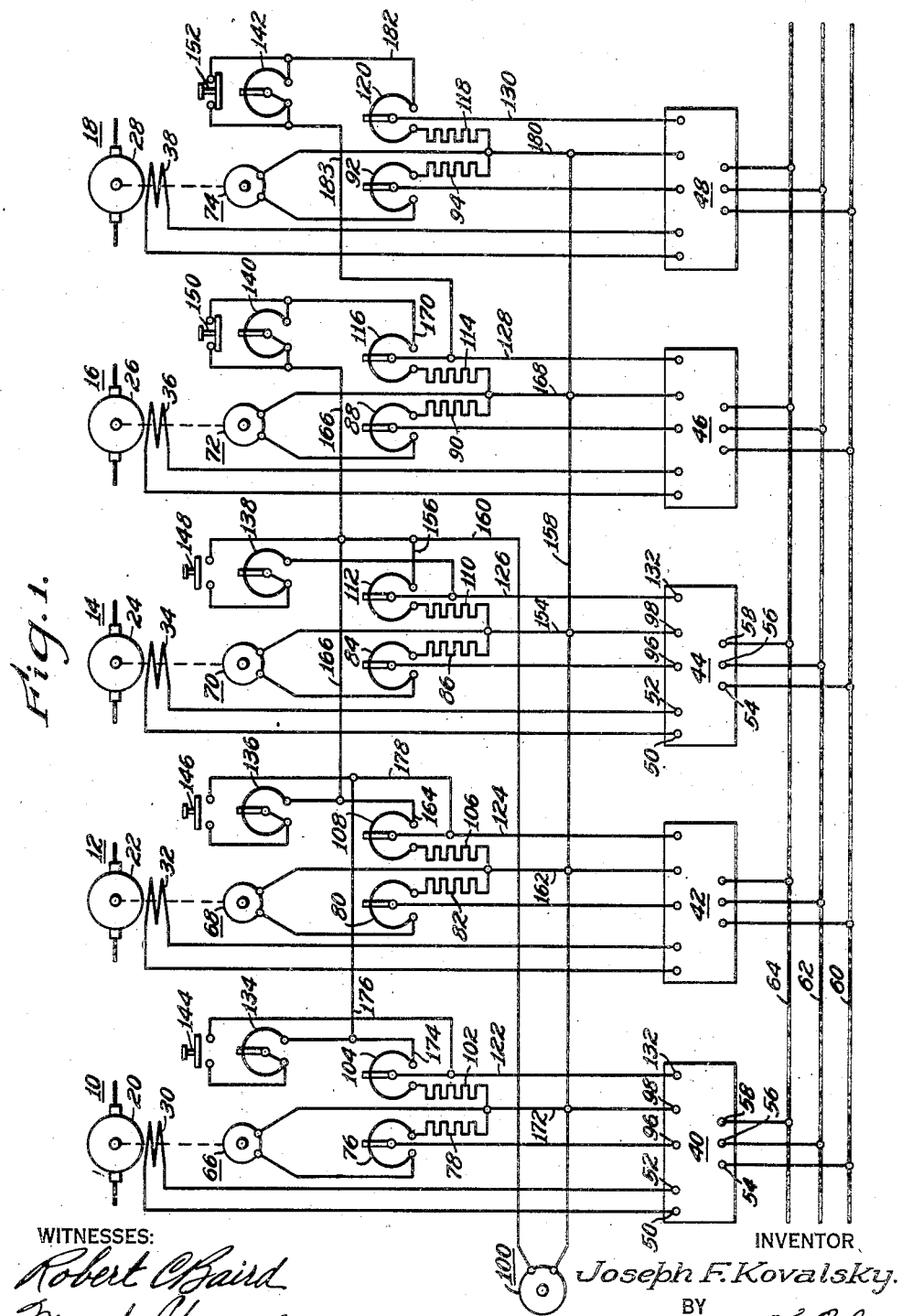
Figure 2:
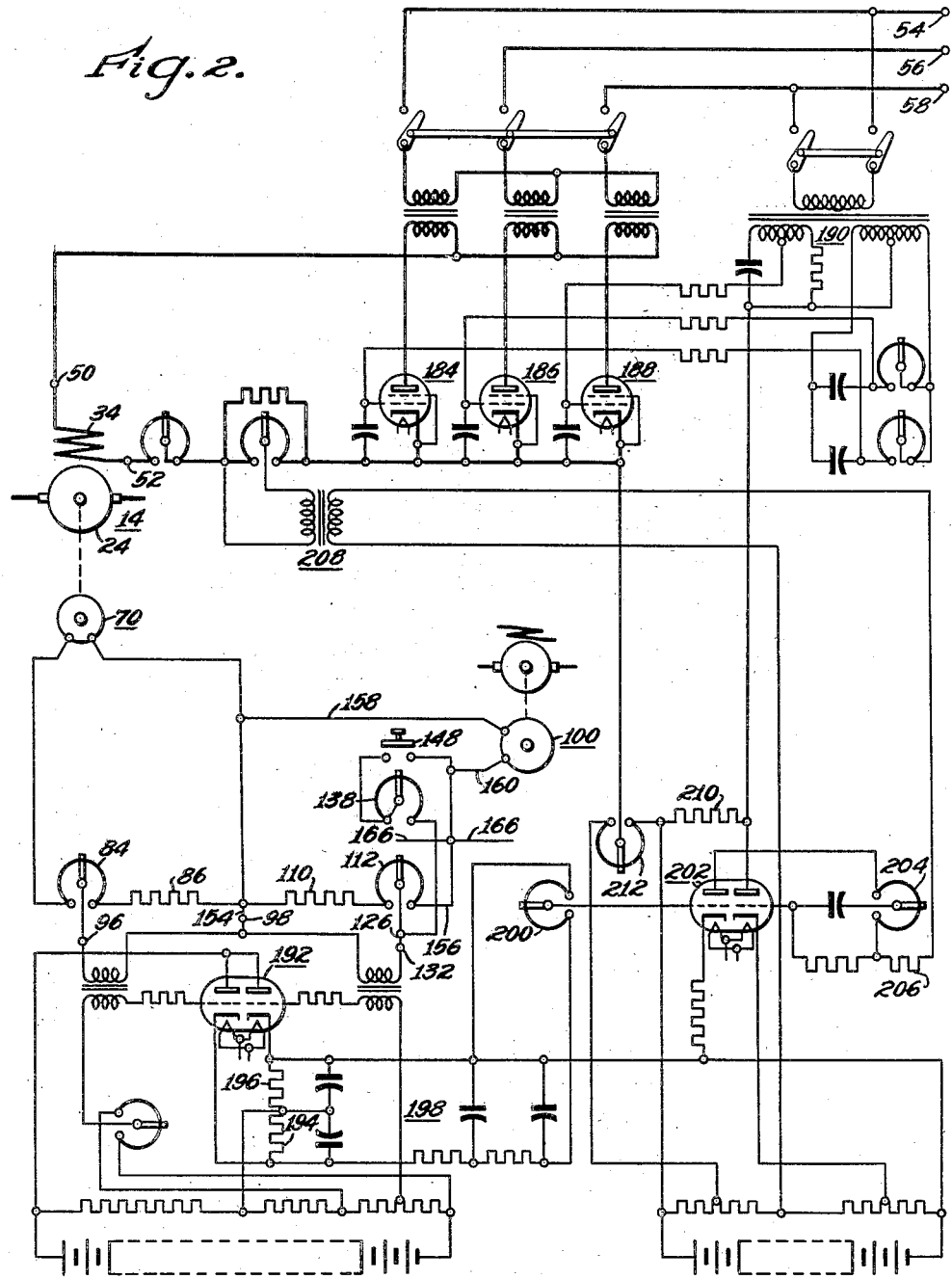

Other objects of this invention will become apparent from the following description when taken in conjunction with the accompanying drawings, in which:

Figure 1 is a diagrammatic view of a system and apparatus embodying the teachings of this invention, and Fig. 2 is a diagrammatic view of a part of Fig. 1 amplified to illustrate the details of an electronic regulator employed in regulating the speed of one of the motors.

Referring to Fig. 1 there is illustrated motors 10, 12, 14, 16 and 18 constituting the drive motors for driving strip material (not shown) such as paper or the like and the speed of which must be maintained substantially constant. Only five motors are illustrated although it will be appreciated that in normal paper mills or the like, many more motors are employed to drive the strip material. The five motors illustrated, however, are sufficient for demonstrating the principles of this invention.

The motors 10, 12, 14, 16 and 18 are provided with armature windings 20, 22, 24, 26 and 28, respectively, connected to sources of supply (not shown) and field windings 30, 32, 34, 36 and 38, respectively, the energization of which is controlled to regulate the respective speeds of the motors.

In order to control the field excitation of the motors, a regulator 40, 42, 44, 46 and 48 is associated with the motor 10, 12, 14, 16 and 18, respectively, the field windings 30, 32, 34, 36 and 38, respectively, being connected to the output terminals 50—52 of each of the regulators, the input terminals 54, 56 and 58 of which are connected to a source of power represented by the conductors 60, 62 and 64, respectively. The regulators 40, 42, 44, 46 and 48 are preferably of the electronic type illustrated in Fig. 2 and will be referred to hereinafter.

As illustrated each of the motors 10, 12, 14, 16 and 18 are connected to drive an alternating-current tachometer generator 66, 68, 70, 72 and 74, respectively, the output terminals of which are connected across series connected resistors, 76—78, 80—82, 84—86, 88—90 and 92—94, respectively, for providing voltages that are measures of the speeds of the respective motors. The series connected resistors are connected across the input terminals 96 and 98 of the associated regulators 40, 42, 44, 46 and 48 to provide control voltages therefor that are responsive to the speeds of the associated motors 10, 12, 14, 16 and 18, respectively.

Another alternating-current tachometer generator 100 is utilized for providing a constant common reference control voltage. The tachometer 100 may be driven in any suitable manner (not shown) for providing a substantially constant output therefrom. As illustrated, series connected resistors 102—104, 106—108, 110—112, 114—116 and 118—120 are connected in circuit relation to be supplied by the tachometer generator 100. Each of the resistors 104, 108, 112, 116 and 120 is of the adjustable type having a sliding contact member connected by a conductor 122, 124, 126, 128 and 130, respectively, to a terminal 132 of the regulator whereby the series connected resistors 102—104, 106—108, 110—112, 114—116 and 118—120 are connected across the input terminals 98—132 of the regulators 40, 42, 44, 46 and 48, respectively, to provide a definite proportion of the reference voltage as a control voltage for the respective regulators.

In the embodiment illustrated, an adjustable auxiliary resistor 134, 136, 138, 140 and 142 is associated with the adjustable resistor 104, 108, 112, 116 and 120, respectively, push-button switches 144, 146, 148, 150 and 152, respectively, being provided for connecting the auxiliary resistors in circuit relation with the associated main adjustable resistors as desired. The push-button switches 144, 146 and 148 are normally maintained in the open circuit position as by suitable springs (not shown) and are disposed when actuated to a circuit closing position to connect the auxiliary resistors 134, 136 and 138, respectively, in parallel circuit relation with a part of the main resistor 104, 108 and 112, respectively. On the other hand, the push-button switches 150 and 152 are normally maintained in a circuit closing position by springs (not shown) to shunt the auxiliary resistors 140 and 142, respectively, and are disposed when actuated to a circuit opening position to remove the shunt to effect the connection of the auxiliary resistor in series circuit with the main resistor 116 and 120, respectively.

The series connected resistors 106—108, 110—112 and 114—116 are connected to be supplied directly from the constant reference source represented by the alternating current tachometer generator 100. Thus the series connected resistors 110—112 are connected by conductors 154 and 156 to the supply conductors 158 and 160, respectively, of the tachometer generator 100; the series connected resistors 106—108 are connected by conductor 162 and conductors 164 and 166 to supply conductors 158 and 160, respectively; and the series connected resistors 114—116 are connected by conductor 168 and conductor 170, push-button switch 150 and conductor 166 to supply conductors 158 and 160, respectively. Thus any adjustment of the resistors 84, 112 and 138 or change in the operation of the tachometer generator 70 or the operation of push-button switch 148 of the controls for regulator 44 to control the operation of the associated motor 14 is independent of the other controls and will have no effect on the controls of the motors positioned to either side of the motor 14 of the composite drive.

In order to proportionally vary the speed of motor 10 in relation to certain controlled changes in the speed of motor 12 the series connected resistors 102—104 utilized for determining the reference voltage supplied to the regulator 40 is connected at one end by conductor 172 to supply conductor 158 and at the other end by conductors 174, 176, 178 and 124 to the movable contact member of resistor 108 whereby an adjustment of resistor 108 or the connection of resistor 136 in parallel therewith affects the voltage impressed across the series connected resistors 102—104.

Likewise, the series connected resistors 118—120 associated with the motor 18 at the other end of the drive is connected at one end by conductor 180 to supply conductor 158, the other end being connected by conductor 182, push-button switch 152 and conductors 183 and 128 to the movable contact member of resistor 116 whereby an adjustment of resistor 116 or the connection of auxiliary resistor 140 in series circuit therewith directly affects the voltage impressed across the series connected resistors 118—120 to effect a proportional change in the reference voltage supplied to the regulator 48. As will be appreciated, changes in the resistor 120 or the resistor 104 will have no effect on the other controls connected between the common source represented by the supply conductors 158 and 160 and the control resistor so adjusted or changed.

Referring to Fig. 2 there is illustrated an electronic regulator suitable for use as the regulators 40, 42, 44, 46 and 48. In this instance the regulator is represented as being associated with the central motor 14 of Fig. 1, like reference numerals being employed for identifying like components in both figures.

Generally, the regulator comprises a full-wave rectifier in the form of three rectifier valves 184, 186 and 188 and a phase shifter 190 associated therewith connected through the terminals 54, 56 and 58 to the source of power supply 60, 62 and 64, respectively, for supplying the excitation of the field winding 34 of the motor 14. The conductivity of the rectifier valves 184, 186 and 188 is controlled by controlling the grid bias thereof in response to an unbalance between the voltage across the series connected resistors 84—86 and the opposing reference voltage across the series connected resistors 110—112.

The voltages across the series connected resistors 84—86, or a part thereof, which is a measure of the speed of the motor 14 is impressed on the first grid of a twin triode vacuum valve 192 whereas the reference voltage as measured across series connected resistors 110—112 is impressed on the second grid of the valve 192 to control the conductivity of the first and second anode-cathode circuits including resistors 194 and 196, respectively, thereof. The voltages appearing across resistors 194 and 196 are of opposite polarity and are connected through a filter circuit 198 for impressing a voltage on a control resistor 200 which will be a measure of any unbalance between the speed measuring voltage and the reference voltage constituting the control voltages.

The control resistor 200 is connected in the grid biasing circuit of the first section of another twin triode vacuum valve 202 to control the output of such amplifier valve. Thus the anode-cathode circuit of the first section of valve 202 includes resistors 204 and 206 and the secondary winding of a damping transformer 208 in circuit therewith and interconnected in the grid circuit of the second section of valve 202 so that the current flow therethrough controls the grid bias of the second anode-cathode circuit of valve 202. The anode-cathode circuit of the second section of valve 202 includes a resistor 210 connected in opposition to a resistor 212, the latter having a constant potential drop thereacross, so that the voltage across resistor 210 functions in opposition to the potential across resistor 212 for controlling the grid bias and consequently the conductivity of the rectifier valves 184, 186 and 188 to control the field excitation of the motor 14 to maintain the speed thereof substantially constant.

A more complete and detailed description of the regulator illustrated in Fig. 2 and the operation thereof may be had by reference to the copending application Serial No. 783,100 filed October 30, 1947, in the names of S. L. Burgwin et al., and by reference thereto is made a part of this disclosure. This regulator is particularly useful in the system of Fig. 1 as it is very sensitive and fast in operation. Other electronic regulators employing two opposing control voltages and which have the same fast sensitive response can however be employed as the regulators 40, 42, 44, 46 and 48.

In operation, with the motors 10, 12, 14, 16 and 18 operating at predetermined relative speeds to drive strip material (not shown) in a predetermined manner, the tachometer generators 66, 68, 70, 72 and 74 are driven to produce a voltage across terminals 96 and 98 of the respective regulators 40, 42, 44, 46 and 48 which is a measure of the speed of the respective motors. By adjusting resistors 104, 108, 112, 116 and 120 the reference voltage impressed across terminals 98 and 132 is balanced against the speed measuring voltages for the given speeds of the respective motors which are to be maintained. Assuming that the strip material (not shown) is paper and is being driven by the motors 10, 12, 14, 16 and 18 towards the left of Fig. 1, then the speed of the motors increase from motor 18 towards motor 10.

The resistors 108, 112 and 116 of the control for motors 12, 14 and 16, respectively, are directly connected across the conductors 158 and 160 and can, therefore, be adjusted independently of each other to adjust the speed of an associated motor without affecting the speed of the other two motors. For example, if it is desired to increase the speed of motor 14, then the sliding contact arm of resistor 112 is manually adjusted to effect an increase in the reference voltage impressed across terminals 98 and 132 of regulator 44. By increasing the reference voltage impressed on the grid of the second section of valve 192 in this manner with respect to the speed measuring voltage impressed on the grid circuit of the first section of valve 192, the second section of valve 192 is rendered more conducting than the first section with the result that the voltage drop across resistor 196 is larger than that across resistor 194 so that the resulting voltage impressed on the control resistor 200 through the filter circuit 198 is of a polarity to give a more positive bias on the grid of the first section of valve 202.

By increasing the conductivity of the first anode-cathode circuit of valve 202 in this manner, the flow of current through resistors 204 and 206 increases the positive bias applied to the second grid of valve 202 to increase the conductivity of the second anode-cathode circuit of valve 202 to increase the flow of current through resistor 210 in opposition to the fixed potential of resistor 212. By increasing the voltage across resistor 210 in this manner a less positive direct-current biasing potential is impressed on the grid-cathode circuits of the rectifier valves 184, 186 and 188 to effect a decrease in the conductivity thereof to decrease the current flow through the field winding 34 and thereby effect an increase in the speed of the motor 14.

A momentary increase in the speed of motor 14 can be obtained by actuating the switch 148 to connect the auxiliary resistor 138 in parallel with a section of the main resistor 112 and thereby effect an increase in the reference voltage applied across terminals 98 and 132 of the regulator 44 with respect to the speed measuring voltage applied across terminals 96 and 98 of the regulator. In this case, however, the increase in speed is obtained only for the duration of the operation of switch 148 for as soon as the operating pressure is released therefrom the switch 148 is returned to its circuit opening position to disconnect the resistor 138 from the parallel circuit connection with resistor 112.

The same operation for obtaining a permanent increase in the speed of motor 12 can be obtained by adjusting the contact arm of resistor 108 to increase the reference voltage applied to terminals 98 and 132 of regulator 42 or a momentary increase can be obtained by operating switch 146 to connect resistor 136 in parallel circuit relation with a section of the resistor 108. This change in the speed of motor 12 can be obtained without affecting the speed of motors 14, 16 and 18.

The change in the control resistor 108 associated with motor 12 or the parallel connection of resistors 136 and 108, as described hereinbefore, will however effect an automatic proportional change in the speed of motor 10. This is because the resistor 104 of the controls for motor 10 is progressively connected at one end through conductors 174, 176, 178 and 124 to the movable contact arm of resistor 108 and any change in the effective resistance thereof is reflected in the potential drop across the series connected resistors 102—104 of the controls associated with motor 10. Thus when the resistor 108 is adjusted or resistors 108 and 136 are connected in parallel to effect an increase in the reference voltage applied across terminals 98 and 132 of regulator 42 a proportional increase in the reference voltage applied across terminals 98 and 132 of regulator 40 will be simultaneously obtained to effect an operation of regulator 40 to increase the speed of motor 10.

On the other hand, if it is desired to increase the speed of motor 10 without affecting the speed of motors 12, 14, 16 and 18 then either the resistor 104 is adjusted to obtain a permanent increase in the reference voltage applied to regulator 40 or the switch 144 is manually operated to connect resistors 134 and 104 in parallel to increase the reference voltage only for the duration of the operation of the switch 144.

The speed of motor 16 can be adjusted by operating the contact arm of resistor 116 to effect an increase or decrease in the reference voltage applied to regulator 46 depending upon whether or not the desired change in the speed of the motor is an increase or a decrease. This change can be made without affecting the speed of motors 10, 12 and 14 but will be proportionally reflected in a change of the speed of motor 18 since a section of the main resistor 116 is connected in series with the main resistor 120 of the control associated with motor 18.

If the motor 16 should be operating too fast tending to put too much tension on the strip material (not shown) in the stretch between motors 16 and 18 then it is necessary to slow down motor 16. The decrease in speed may be a permanent decrease such as is obtained by adjusting the contact arm of resistor 116 or a temporary or momentary decrease obtained by actuating switch 150 to an open circuit position to remove the shunt from across auxiliary resistor 140 and thereby effect the connection of resistor 140 in series circuit with the main resistor 116 to decrease the reference voltage with respect to the speed measuring voltage applied to the regulator 46. Such adjustment in the control voltages applied to the regulator 46 controls the operation thereof to increase the flow of current through the field winding 26 to decrease the speed of the motor 16.

Since the contact arm of main resistor 116 is connected in series circuit with the main resistor 120 of the control for motor 18 the change in resistance in the control for motor 16 has a direct effect on the control circuit of motor 18 to effect a proportional decrease in the reference voltage supplied thereby to the regulator 48 to control the operation thereof to proportionally decrease the speed of motor 18.

While the speed of motor 18 is affected by an adjustment of the resistors 116 and 140 in the control associated with motor 16 as described, the speed of motor 18 can also be independently adjusted without affecting the speed of the other motors. Thus a permanent adjustment can be obtained by adjusting the contact arm of resistor 120 or a momentary adjustment can be obtained to decrease the speed of motor 18 by operating the switch 152 to effect a change in the reference voltage applied to the regulator 48 with respect to the speed measuring voltage derived from the tachometer generator 74 and applied to the regulator in the same manner as described with respect to the adjustment of the controls associated with the motor 16.

While only five motors are illustrated in Fig. 1, it will of course be appreciated that this is only for demonstrating the invention for in actual practice, such as in a paper mill, from seven to twelve motors will usually be employed. In such instances, the additional motors to the left of motor 10 illustrated will have controls such as are illustrated for motor 10 and will have the controls progressively connected one to another and to the contact arm of main resistor 104 in the same manner as main resistor 104 associated with motor 10 is connected to the contact arm of main resistor 108 of the control associated with motor 12. This will result in a progressive proportional change in the reference voltages of each such succeeding controls when the reference voltage of the control associated with motor 10 is changed either by adjusting resistor 104, operating the switch 144 or by the effect of a change in the corresponding control of motor 12.

Likewise, any additional motors to the right of motor 18 will have controls such as are illustrated for motor 18 and will have the controls progressively connected one to another in sequence and to the contact arm of main resistor 120 in the same manner as the control for motor 18 is connected to the contact arm of the main resistor 116 of the control associated with motor 16. Thus any change in the reference voltage supplied by the control associated with any one of the motors will effect a proportional change in the reference voltage supplied by the control associated with each of the succeeding motors without affecting the controls connected between the common source represented by conductors 158 and 160 and the motor whose controls are so adjusted and without affecting the progressively connected controls connected to the other side of the common source.

In practice, a very close control of the operation of the motors is obtained and adjustments are readily made when needed. The system is efficient in operation and effects economies in that quality production of strip material is obtained at all times. The system employs standard components and can be readily duplicated.

I claim as my invention:

1. In a system for regulating the relative speeds of a plurality of drive motors each of which is provided with a field winding, the combination comprising, an electronic regulator for each of the motors disposed for operation to control the field excitation of the associated motor, a plurality of sources of voltage each of which constitutes a measure of the speed of one of the motors, a plurality of impedance means for providing a plurality of reference voltages, each of the reference voltages cooperating with one of the speed measuring voltages to provide a pair of opposed control voltages for controlling the operation of one of the electronic regulators, and means for individually adjusting each of the impedance means to adjust the reference voltage supplied thereby, the impedance means being progressively connected to one another from a given reference source whereby an adjustment of one of the impedance means effects an automatic progressive change in the reference voltages supplied by the other impedance means in a direction away from the given reference source without affecting the reference voltage supplied by the impedance means connected between the given reference source and said one of the impedance means.

2. In a system for regulating the relative speeds of a plurality of drive motors each of which is provided with a field winding, the combination comprising, an electronic regulator for each of the motors disposed for operation to control the field excitation of the associated motor, a plurality of sources of voltage each of which constitutes a measure of the speed of one of the motors, a plurality of impedance means for providing a plurality of reference voltages, each of the reference voltages cooperating with one of the speed measuring voltages to provide a pair of opposed control voltages for controlling the operation of one of the electronic regulators, and an adjustable contact member for each of the impedance means disposed for operation to adjust the reference voltage supplied thereby, the impedance means being progressively connected to one another from a given reference source by sequentially connecting the adjustable contact member of each of the impedance means to the next impedance means whereby an adjustment of one of the impedance means effects an automatic progressive change in the reference voltages supplied by the other impedance means in a direction away from the given reference source without affecting the reference voltages supplied by the impedance means connected between the given reference source and said one of the impedance means.

3. In a system for regulating the relative speeds of a plurality of drive motors each of which is provided with a field winding, the combination comprising, an electronic regulator for each of the motors disposed for operation to control the field excitation of the associated motor, a plurality of sources of voltage each of which constitutes a measure of the speed of one of the motors, a plurality of impedance means for providing a plurality of reference voltages, each of the reference voltages cooperating with one of the speed measuring voltages to provide a pair of opposed control voltages for controlling the operation of one of the electronic regulators, means for individually adjusting each of the impedance means to adjust the reference voltage supplied thereby, the impedance means being progressively connected to one another from a given reference source, an auxiliary impedance means disposed to be connected in circuit relation with one of the adjustable impedance means to effect a change in the reference voltage supplied thereby, and means disposed for manual operation to effect the connection of the auxiliary impedance means and the adjustable impedance means to change the reference voltage supplied thereby for the duration of the manual operation, said change in the reference voltage effecting an automatic progressive change in the reference voltages supplied by the other progressively connected impedance means in a direction away from the given reference source and the connected auxiliary and adjustable impedance means for the duration only of the manual operation of the connecting means.

4. In a system for regulating the relative speeds of a plurality of drive motors each of which is provided with a field winding, the combination comprising, an electronic regulator for each of the motors disposed for operation to control the field excitation of the associated motor, a plurality of sources of voltage each of which constitutes a measure of the speed of one of the motors, a plurality of impedance means for providing a plurality of reference voltages, each of the reference voltages cooperating with one of the speed measuring voltages to provide a pair of opposed control voltages for controlling the operation of one of the electronic regulators, means for individually adjusting each of the impedance means to adjust the reference voltage supplied thereby, the impedance means being progressively connected to one another from a given reference source whereby an adjustment of one of the impedance means effects an automatic progressive change in the reference voltages supplied by the other impedance means in a direction away from the given reference source without affecting the reference voltages supplied by the impedance means connected between the given reference source and said one of the impedance means, an auxiliary impedance means associated with each of the adjustable impedance means, and means disposed for manual operation to individually and selectively connect each of the auxiliary impedance means in circuit relation with its associated adjustable impedance means to effect a change in the reference voltage supplied thereby for the duration of the manual operation of the connecting means, said latter change in the reference voltage also effecting an automatic progressive change in the reference voltages supplied by the other impedance means in a direction away from the given reference source and the connected auxiliary and adjustable impedance means for the duration of the manual operation of the connecting means.

5. In a system for regulating the relative speeds of a plurality of drive motors each of which is provided with a field winding, the combination comprising, an electronic regulator for each of the motors disposed for operation to control the field excitation of the associated motor, a plurality of sources of voltage each of which constitutes a measure of the speed of one of the motors, a plurality of impedance means for providing a plurality of reference voltages, each of the reference voltages cooperating with one of the speed measuring voltages to provide a pair of cooperating control voltages for controlling the operation of an associated electronic regulator, and means for adjusting each of the impedance means to adjust the reference voltage supplied thereby, the impedance means being progressively connected to one another in two directions from a common reference source intermediate the end impedance means whereby an adjustment of one of the impedance means connected in one of the directions from the common source effects an automatic progressive change in the reference voltages supplied by the other impedance means in said one direction without affecting either the reference voltages supplied by the impedance means connected between said common source and said one of the impedance means or the reference voltages supplied by the impedance means in the other direction from the common source.

6. In a system for regulating the relative speeds of a plurality of drive motors each of which is provided with a field winding, the combination comprising, an electronic regulator for each of the motors disposed for operation to control the field excitation of the associated motor, a plurality of sources of voltage each of which constitutes a measure of the speed of one of the motors, a plurality of impedance means for providing a plurality of reference voltages, each of the reference voltages cooperating with one of the speed measuring voltages to provide a pair of cooperating control voltages for controlling the operation of an associated electronic regulator, means for adjusting each of the impedance means to adjust the reference voltage supplied thereby, the impedance means being progressively connected to one another in two directions from a common reference source intermediate the end impedance means, an auxiliary impedance means disposed to be connected in circuit relation with one of the adjustable impedance means, and means disposed for manual operation to effect the connection between the auxiliary and the adjustable impedance means to change the reference voltage supplied thereby for the duration of the manual operation, said change in the reference voltage effecting an automatic progressive change in the reference voltages supplied by the other progressively connected impedance means in a direction away from and to the one side of the common reference source and the connected auxiliary and adjustable impedance means for the duration only of the manual operation of the connecting means.

7. In a system for regulating the relative speeds of a plurality of drive motors each of which is provided with a field winding, the combination comprising, an electronic regulator for each of the motors disposed for operation to control the field excitation of the associated motor, a plurality of sources of voltage each of which constitutes a measure of the speed of one of the motors, a plurality of impedance means for providing a plurality of reference voltages, each of the reference voltages cooperating with one of the speed measuring voltages to provide a pair of cooperating control voltages for controlling the operation of an associated electronic regulator, means for adjusting each of the impedance means to adjust the reference voltage supplied thereby, the impedance means being progressively connected to one another in two directions from a common reference source intermediate the end impedance means, an auxiliary impedance means associated with each of the progressively connected adjustable impedance means, and a switching means for each of the auxiliary impedance means disposed for individual manual operation to selectively connect one of the auxiliary impedance means in circuit relation with its associated adjustable impedance means to effect a change in the reference voltage supplied thereby for the duration only of the manual operation of the switching means, said change in the reference voltage effecting an automatic progressive change in the reference voltages supplied by the other progressively connected adjustable impedance means in a direction away from and to the one side only of the common reference source and the connected auxiliary and adjustable impedance means for the duration only of the manual operation of the switching means.

8. In a system for regulating the relative speeds of a plurality of drive motors each of which is provided with a field winding, the combination comprising, a regulator for each of the motors disposed for operation to control the field excitation of the associated motor, a plurality of sources of voltage each of which constitutes a measure of the speed of one of the motors, a plurality of main impedance means for providing a plurality of reference voltages, each of the reference voltages cooperating with one of the speed measuring voltages to provide a pair of cooperating control voltages for controlling the operation of an associated regulator, means for adjusting each of the main impedance means to effect a permanent change in the reference voltage supplied thereby, the main impedance means being progressively connected to one another from a given reference source whereby an adjustment of one of the main impedance means effects an automatic progressive fixed change in the reference voltages supplied by the other progressively connected main impedance means in a direction away from the given reference source without affecting the reference voltages supplied by the main impedance means connected between the given reference source and said one of the main impedance means, an auxiliary impedance means associated with each of the main impedance means, and a switching means for each of the auxiliary impedance means disposed for individual operation to connect an auxiliary impedance means in circuit relation with its associated main impedance means to effect a momentary change in the reference voltage supplied thereby for the duration only of the operation of the switching means, said momentary change in the reference voltage also effecting an automatic momentary change in the reference voltages supplied by the progressively connected main impedance means in a direction away from the given reference source and the connected auxiliary and main impedance means for the duration of the operation of the switching means.

9. In a system for regulating the relative speeds of a plurality of drive motors each of which is provided with a field winding, the combination comprising, a regulator for each of the motors disposed for operation to control the field excitation of the associated motor, a plurality of sources of voltage each of which constitutes a measure of the speed of one of the motors, a plurality of main impedance means for providing a plurality of reference voltages, each of the reference voltages cooperating with one of the speed measuring voltages to provide a pair of cooperating control voltages for controlling the operation of an associated regulator, means for adjusting each of the main impedance means to effect a permanent change in the reference voltage supplied thereby, the main impedance means being progressively connected to one another in two directions from a common reference source intermediate the end impedance means whereby an adjustment of one of the main impedance means connected in one of the directions from the common source effects an automatic progressive fixed change in the reference voltages supplied by the other main impedance means in said one direction without affecting either the reference voltages supplied by the other main impedance means in said one direction without affecting either the reference voltages supplied by the main impedance means connected between said common source and said one of the main impedance means or the reference voltages supplied by the main impedance means in the other direction from the common source, an auxiliary impedance means associated with each of the main impedance means, and a switching means for each of the auxiliary impedance means disposed for individual operation to connect an auxiliary impedance means in circuit relation with its associated main impedance means to effect a momentary change in the reference voltage supplied thereby for the duration only of the operation of the switching means, said momentary change in the reference voltage also effecting an automatic momentary change in the reference voltages supplied by the other progressively connected main impedance means in a direction away from and to the one side only of the common reference source and the connected auxiliary and main impedance means for the duration only of the manual operation of the switching means.

10. In a system for regulating the relative speeds of a plurality of drive motors each of which is provided with a field winding, the combination comprising, a regulator for each of the motors disposed for operation to control the field excitation of the associated motor, a plurality of sources of voltage each of which constitutes a measure of the speed of one of the motors, a plurality of resistors connected in circuit relation to a common source of energy for providing a plurality of reference voltages, each of the reference voltages cooperating with one of the speed measuring voltages to provide a pair of opposed control voltages for controlling the operation of one of the regulators, a movable contact arm for each of the resistors disposed to be operated to adjust the reference voltage supplied thereby, the contact arms of each of the resistors being connected to a terminal of the next succeeding resistor in a direction away from the common source to progressively connect the resistors to the common source whereby an operation of one of the contact arms also effects a progressive change in the reference voltages supplied by the other resistors in a direction away from the common source without affecting the reference voltages supplied by the resistors connected between the common source and said one of the contact arms.

11. In a system for regulating the relative speeds of a plurality of drive motors each of which is provided with a field winding, the combination comprising, a regulator for each of the motors disposed for operation to control the field excitation of the associated motor, a plurality of sources of voltage each of which constitutes a measure of the speed of one of the motors, a plurality of main resistors progressively connected in circuit relation to one another in two directions from a common source of energy intermediate the end resistors for providing a plurality of reference voltages, each of the reference voltages cooperating with one of the speed measuring voltages to provide a pair of opposed control voltages for controlling the operation of one of the regulators, a movable contact arm for each of the main resistors disposed to be operated to adjust the reference voltage supplied thereby, the contact arm of each of the resistors to each side of the common source being connected to an end terminal of the next succeeding main resistor in both directions away from the common source, an auxiliary resistor associated with each of the main resistors, and a switch associated with each of the auxiliary resistors disposed for operation to connect the associated auxiliary resistor to effect a change in the reference voltage supplied thereby for the duration only of the switching operation, each of the switches to one side of the common source being disposed for operation to effect the connection of the associated auxiliary resistor in series circuit with the associated main resistor to decrease the reference voltage supplied thereby, each of the switches to the other side of the common source being disposed for operation to effect the connection of the associated auxiliary resistor in parallel with its associated main resistor to increase the reference voltage supplied thereby, said change occasioned by operation of one of the switches also effecting a progressive change in each of the reference voltages supplied by the other main resistors in a direction away from and to one side only of the common source and the connected auxiliary and main resistors for the duration only of the manual operation of said one of the switches.

12. In a system for regulating the relative speeds of a plurality of drive motors, the combination comprising, an electronic regulator for each of the motors disposed for operation to control the operation of the associated motor, a plurality of sources of voltage each of which constitutes a measure of the speed of one of the motors, a plurality of impedance means for providing a plurality of reference voltages, each of the reference voltages cooperating with one of the speed measuring voltages to provide a pair of opposed control voltages for controlling the operation of one of the electronic regulators, and means for individually adjusting each of the impedance means to adjust the reference voltage supplied thereby, the impedance means being progressively connected to one another from a given reference source whereby an adjustment of one of the impedance means effects an automatic progressive change in the reference voltages supplied by the other impedance means in a direction away from the given reference source without affecting the reference voltage supplied by the impedance means connected between the given reference source and said one of the impedance means.

13. In a system for regulating the relative speeds of a plurality of drive motors, the combination comprising, an electronic regulator for each of the motors disposed for operation to control the operation of the associated motor, a plurality of sources of voltage each of which constitutes a measure of the speed of one of the motors, a plurality of impedance means for providing a plurality of reference voltages, each of the reference voltages cooperating with one of the speed measuring voltages to provide a pair of opposed control voltages for controlling the operation of one of the electronic regulators, and an adjustable contact member for each of the impedance means disposed for operation to adjust the reference voltage supplied thereby, the impedance means being progressively connected to one another from a given reference source by sequentially connecting the adjustable contact member of each of the impedance means to the next impedance means whereby an adjustment of one of the impedance means effects an automatic progressive change in the reference voltages supplied by the other impedance means in a direction away from the given reference source without affecting the reference voltages supplied by the impedance means connected between the given reference source and said one of the impedance means.

14. In a system for regulating the relative speeds of a plurality of drive motors, the combination comprising, an electronic regulator for each of the motors disposed for operation to control the operation of the associated motor, a plurality of sources of voltage each of which constitutes a measure of the speed of one of the motors, a plurality of impedance means for providing a plurality of reference voltages, each of the reference voltages cooperating with one of the speed measuring voltages to provide a pair of opposed control voltages for controlling the operation of one of the electronic regulators, means for individually adjusting each of the impedance means to adjust the reference voltage supplied thereby, the impedance means being progressively connected to one another from a given reference source, an auxiliary impedance means disposed to be connected in circuit relation with one of the adjustable impedance means to effect a change in the reference voltage supplied thereby, and means disposed for manual operation to effect the connection of the auxiliary impedance means and the adjustable impedance means to change the reference voltage supplied thereby for the duration of the manual operation, said change in the reference voltage effecting an automatic progressive change in the reference voltages supplied by the other progressively connected impedance means in a direction away from the given reference source and the connected auxiliary and adjustable impedance means for the duration only of the manual operation of the connecting means.

JOSEPH F. KOVALSKY.

No references cited.